(12) United States Patent
Marler et al.

(10) Patent No.: US 9,387,954 B2
(45) Date of Patent: Jul. 12, 2016

(54) SHELVING BASE BRACKET

(71) Applicants: Jon R. Marler, Syracuse, IN (US); Travis D. Ferguson, Camdenton, MO (US)

(72) Inventors: Jon R. Marler, Syracuse, IN (US); Travis D. Ferguson, Camdenton, MO (US)

(73) Assignee: MIDWEST WIRE PRODUCTS LLC, Marion, IN (US)

( * ) Notice: Subject to any disclaimer, the term of this patent is extended or adjusted under 35 U.S.C. 154(b) by 0 days.

(21) Appl. No.: 14/702,483

(22) Filed: May 1, 2015

(65) Prior Publication Data

US 2015/0314961 A1    Nov. 5, 2015

Related U.S. Application Data (60) Provisional application No. 61/987,309, filed on May 1, 2014.

(51) Int. Cl.
| | | |
|---|---|---|
| *B65D 19/44* | (2006.01) | |
| *B65G 1/10* | (2006.01) | |
| *B65G 1/02* | (2006.01) | |
| *A47B 91/00* | (2006.01) | |
| *A47B 97/00* | (2006.01) | |
| *A47B 47/00* | (2006.01) | |
| *A47B 47/02* | (2006.01) | |

(52) U.S. Cl.
CPC .............. *B65D 19/44* (2013.01); *A47B 91/005* (2013.01); *A47B 97/00* (2013.01); *B65G 1/02* (2013.01); *B65G 1/10* (2013.01); *A47B 47/0083* (2013.01); *A47B 47/024* (2013.01); *B65D 2519/00815* (2013.01)

(58) Field of Classification Search
CPC .................... B65D 19/44; B65D 2519/00815; B65D 2519/00338; B65G 1/10; A47B 87/0215; A47B 47/021
See application file for complete search history.

(56) References Cited

U.S. PATENT DOCUMENTS

| | | | | |
|---|---|---|---|---|
| RE28,244 E | * | 11/1974 | Evans ..................... | A47B 47/03 108/157.13 |
| 7,159,521 B2 | * | 1/2007 | Salmanson ............ | A47B 57/22 108/107 |
| 8,061,521 B1 | * | 11/2011 | Lowry ................... | B65D 19/44 206/576 |
| 8,157,093 B2 | * | 4/2012 | Ishikawa .................. | B65B 5/04 108/51.11 |
| 8,448,582 B2 | * | 5/2013 | Jian ..................... | B65D 19/0097 108/56.3 |

* cited by examiner

*Primary Examiner* — Rodney Mintz
*Assistant Examiner* — Daniel Kenny (57) ABSTRACT

A shelving base bracket is an apparatus that is used to support and transport shelving units. The apparatus includes a crossbar which is used as a structural link between a first L-shaped brace and a second L-shaped brace. The first L-shaped brace and the second L-shaped brace act as legs which support the weight of shelves mounted onto the shelving base bracket. The first L-shaped brace and the second L-shaped brace are both made of a proximal panel and a distal panel. The proximal panel and the distal panel meet at an angle allowing the shelving base bracket to be free-standing. The apparatus also includes a first support-receiving socket and a second support-receiving socket, which connect to the first L-shaped brace and the second L-shaped brace, respectively. The first support-receiving socket and the second support-receiving socket allow for vertical shelving supports to be mounted onto the shelving base bracket.

13 Claims, 8 Drawing Sheets

SECTION A-A

SHELVING BASE BRACKET

The current application claims a priority to the U.S. Provisional Patent application Ser. No. 61/987,309 filed on May 1, 2014.

FIELD OF THE INVENTION

The present invention relates generally to a base attachment that is used to support shelving units. More specifically, the present invention is a free-standing steel bracket that is used to support and transport shelving units and merchandise. The present invention may be part of a stand-alone shelving base or may be reinforced with the use of a pallet.

BACKGROUND OF THE INVENTION

Shelving units are widely used in commercial, industrial, and residential setting. For commercial and industrial purposes, it is often advantageous to make use of shelves which are simple, sturdy, and able to be transported. While pallets are often used for transporting large numbers of products, they often require that products be stacked on top of each other. While this may not be an issue for storing items in a warehouse or in other similar situations, this approach may make it difficult for workers or consumers to access specific products without disturbing the rest. For this reason, it is often beneficial to use shelving units which permit the stacking of multiple shelves which may contain varying types of products. Presently, numerous types of shelving units exist; however, none use a base bracket to support shelves without the use of fasteners which may be used as a stand-alone foundation or may be reinforced with a pallet.

The present invention is a shelving base bracket which allows for numerous shelves to be stacked vertically using standard parts and without the need for fasteners. Two shelving base brackets may be used to create a rigid foundation for a shelving unit. Moreover, two shelving base brackets may be reinforced by a pallet. Both configurations are designed to be transported by a forklift if needed. As weight is added to a shelving unit mounted to the present invention, the entire assembly becomes more stable, thus preventing inadvertent tipping.

DETAILED DESCRIPTION OF THE INVENTION

All illustrations of the drawings are for the purpose of describing selected versions of the present invention and are not intended to limit the scope of the present invention.

With reference to FIGS. 1-3 and 7-8, the present invention is a shelving base bracket that, when used together with another shelving base bracket, may be used to support a shelving unit 30 that includes multiple rows of shelves 31 and vertical shelving supports 32 either with or without the use of a pallet as a base support. It is preferred that the present invention is constructed from a minimum of 11 gauge steel; however, other materials, such as aluminum or stainless steel, may alternatively be used. The present invention comprises a crossbar 1, a first L-shaped brace 3, a second L-shaped brace 4, a first support-receiving socket 8, and a second support-receiving socket 13. The first L-shaped brace 3 and the second L-shaped brace 4 are both used as free-standing legs which support the shelving unit 30 positioned upon the present invention. The first L-shaped brace 3 and the second L-shaped brace 4 both comprise a proximal panel 5 and a distal panel 6. The proximal panel 5 of the first L-shaped brace 3 and the proximal panel 5 of the second L-shaped brace 4 are positioned coplanar to each other. The crossbar 1 is connected in between the proximal panel 5 of the first L-shaped brace 3 and the proximal panel 5 of the second L-shaped brace 4. The crossbar 1 helps to prevent the first L-shaped brace 3 and the second L-shaped brace 4 from moving in relation to each other while bearing the weight of shelves 31 and items or merchandise supported by said shelves 31. The distal panel 6 of the first L-shaped brace 3 is connected adjacent and perpendicular to the proximal panel 5 of the first L-shaped brace 3, opposite to the crossbar 1. The distal panel 6 of the second L-shaped brace 4 is connected adjacent and perpendicular to the proximal panel 5 of the second L-shaped brace 4, opposite to the crossbar 1. Because the proximal panel 5 and the distal panel 6 of the first L-shaped brace 3 and the second L-shaped brace 4 meet at an angle, the shelving base bracket is able to stand without additional support. However, a pallet may be placed in between two shelving base brackets for added stability.

Figure 1:
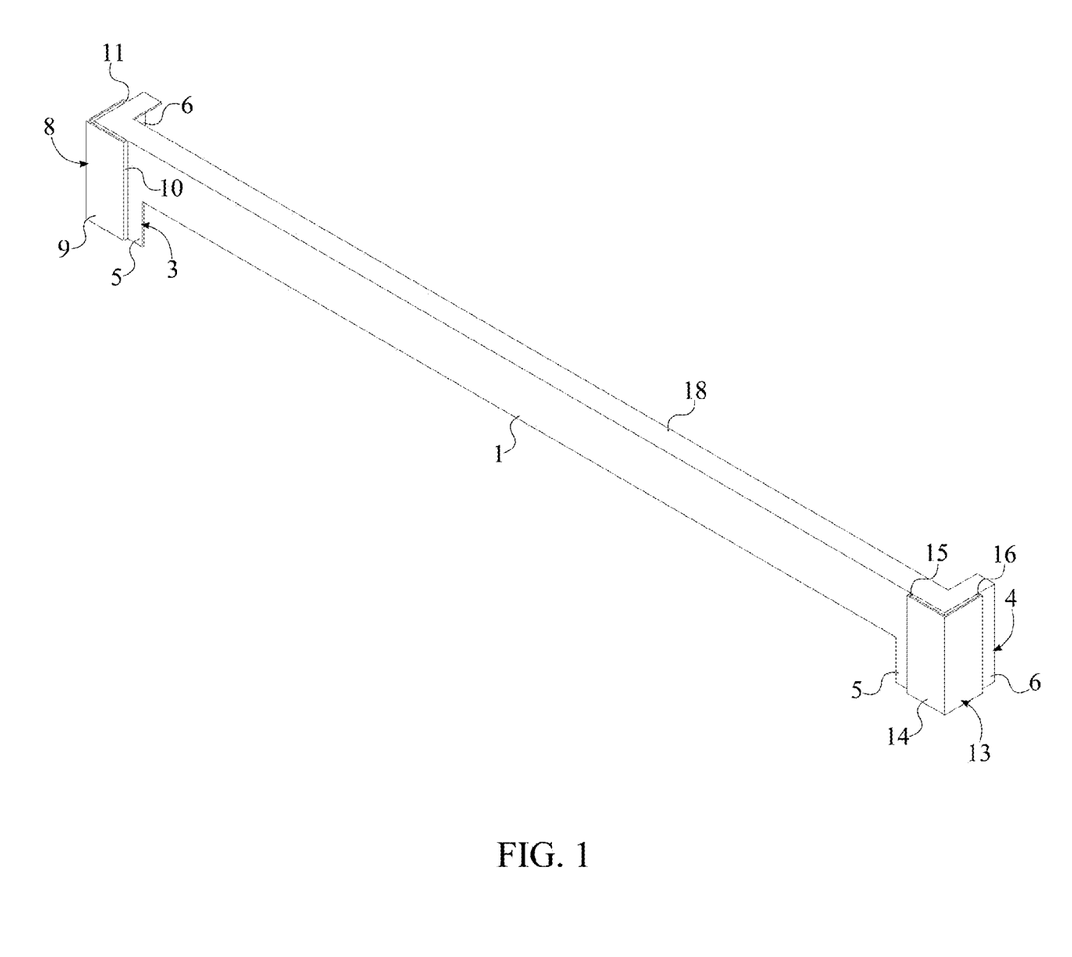
FIG. 1 is a top right perspective view of the present invention.
Figure 2:
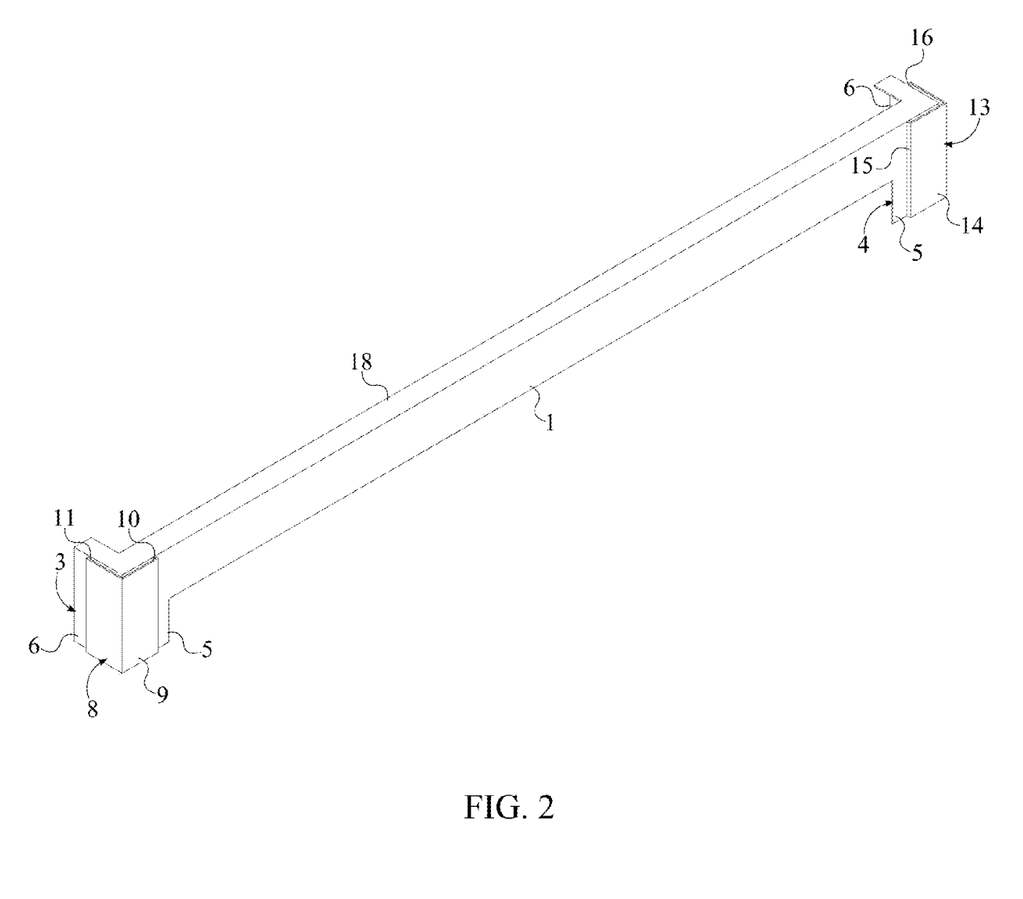
FIG. 2 is a top left perspective view of the present invention.
Figure 3:
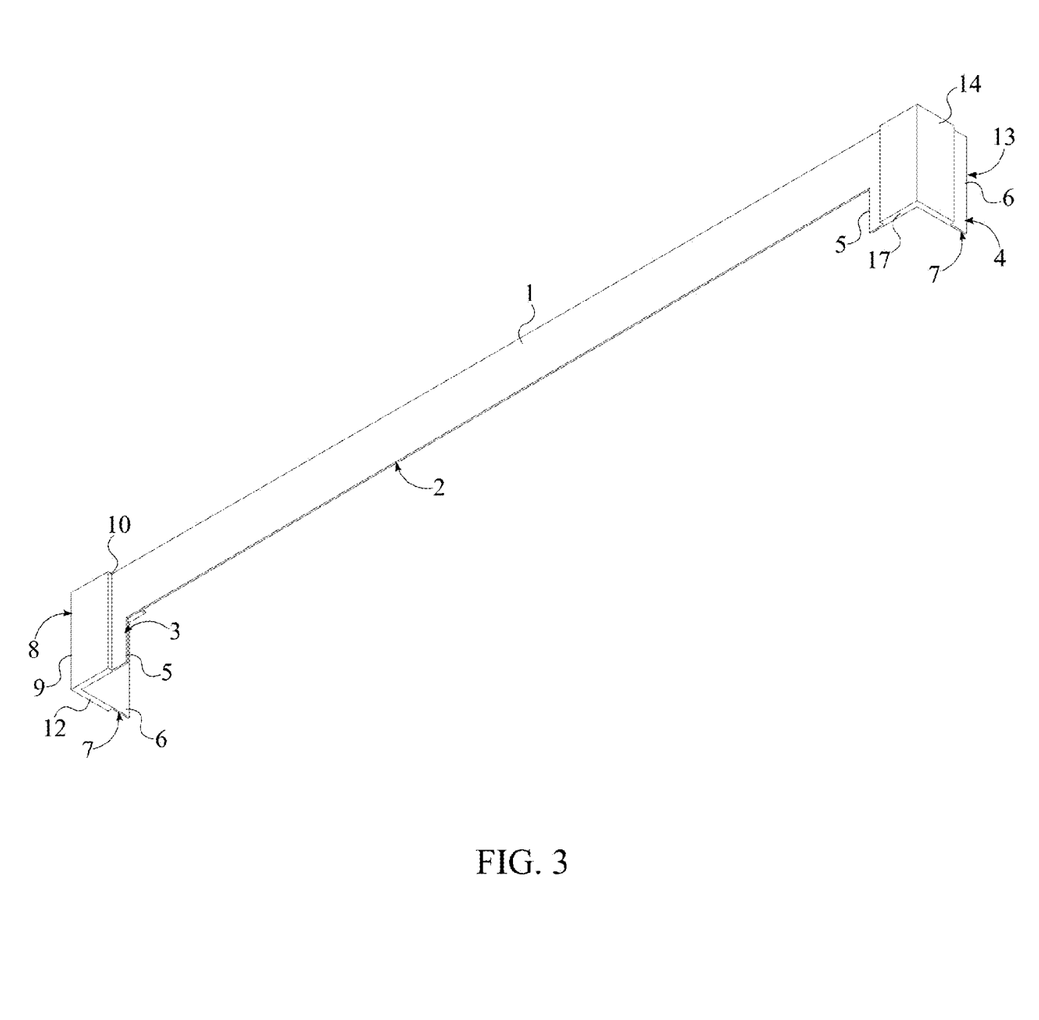
FIG. 3 is a bottom right perspective view of the present invention.

In reference to FIGS. 1-3, the first support-receiving socket 8 and the second support-receiving socket 13 are used to mount the vertical shelving supports 32 to the present invention. The first support-receiving socket 8 is connected about the connection between the proximal panel 5 and the distal panel 6 of the first L-shaped brace 3. The second support-receiving socket 13 is connected about the connection between the proximal panel 5 and the distal panel 6 of the second L-shaped brace 4. The positioning of the first support-receiving socket 8 and the second support-receiving socket 13 allows for the vertical shelving supports 32 to extend vertically from the present invention such that shelves 31 may be supported along the edges of said shelves 31.

The crossbar 1 is an elongated panel which is positioned coplanar to the proximal panel 5 of the first L-shaped brace 3 and the proximal panel 5 of the second L-shaped brace 4. In addition to acting as a structural support for shelving, the crossbar 1 may be lifted to move the shelving unit 30. A fork-engaging surface 2 of the crossbar 1 is positioned offset from a base surface 7 of both the first L-shaped brace 3 and the second L-shaped brace 4. This creates a fork-receiving opening which is delineated by the fork-engaging surface 2, the first L-shaped brace 3, and the second L-shaped brace 4. To move the shelving unit 30, a forklift may be aligned such that the blades of the forklift is inserted into the fork-receiving opening. Then the entire shelving unit 30 may be lifted transported by forcing the blades upwards, against the fork-engaging surface 2.

In reference to FIGS. 1-2, the present invention further comprises a weight-bearing panel 18. The weight-bearing panel 18 increases the structural stability of the shelving base bracket and may be used to support a layer of shelving. Moreover, the weight-bearing panel 18 acts as a stop when the shelving unit 30 is lifted by a pallet positioned in between two shelving base brackets. The weight-bearing panel 18 is positioned perpendicular to both the proximal panel 5 and the distal panel 6 of both the first L-shaped brace 3 and the second L-shaped brace 4. The weight-bearing panel 18 is positioned opposite to the base surface 7 of both the first L-shaped brace 3 and the second L-shaped brace 4. It is essential that the weight-bearing panel 18 is positioned at the top of the shelving base bracket, in relation to the ground. The positioning of the weight-bearing panel 18 helps to evenly distribute the weight of items or the shelves 31 placed on top of the present invention. The weight-bearing panel 18 is connected onto the first L-shaped brace 3, along the crossbar 1, and onto the second L-shaped brace 4. Because of this configuration, the weight-bearing panel 18 helps to prevent the first L-shaped brace 3 and the second L-shaped brace 4 from bending or being damaged during moving.

In reference to FIGS. 1-5, the first support-receiving socket 8 allows a vertical shelving support 32 to be mounted to the present invention. The first support-receiving socket 8 comprises a first jacket 9, a first proximal spacer 10, a first distal spacer 11, and a first support stop 12. The first proximal spacer 10 is laterally connected onto the proximal panel 5 of the first L-shaped brace 3. The first distal spacer 11 is laterally connected onto the distal panel 6 of the first L-shaped brace 3. The first proximal spacer 10 and the first distal spacer 11 are used to offset the first jacket 9 from the first L-shaped brace 3 such that a slot is created. This slot is large enough to secure a vertical shelving support to the present invention. The first jacket 9 is laterally mounted to the first L-shaped brace 3 from the first proximal spacer 10 to the first distal spacer 11. Together, the first proximal spacer 10, the first distal spacer 11, and the first jacket 9 prevent the vertical shelving support from shifting after said shelving support has been mounted to the present invention. The first support stop 12 is connected between the first jacket 9 and the first L-shaped brace 3. The first support stop 12 prevents the vertical shelving support from sliding downward after said shelving support has been mounted to the present invention. This is needed when transporting the shelving unit 30 that use the present invention.

The second support-receiving socket 13 allows a vertical shelving support 32 to be mounted to the present invention. The second support-receiving socket 13 comprises a second jacket 14, a second proximal spacer 15, a second distal spacer 16, and a second support stop 17. The second proximal spacer 15 is laterally connected onto the proximal panel 5 of the second L-shaped brace 4. The second distal spacer 16 is laterally connected onto the distal panel 6 of the second L-shaped brace 4. The second proximal spacer 15 and the second distal spacer 16 are used to offset the second jacket 14 from the second L-shaped brace 4 such that a slot is created. This slot is large enough to secure a vertical shelving support to the present invention. The second jacket 14 is laterally mounted to the second L-shaped brace 4 from the second proximal spacer 15 to the second distal spacer 16. Together, the second proximal spacer 15, the second distal spacer 16, and the second jacket 14 prevent the vertical shelving support from shifting after said shelving support has been mounted to the present invention. The second support stop 17 is connected between the second jacket 14 and the second L-shaped brace 4. The second support stop 17 prevents the vertical shelving support from sliding downward after said shelving support has been mounted to the present invention. This is needed when transporting the shelving unit 30 that use the present invention.

Figure 4:
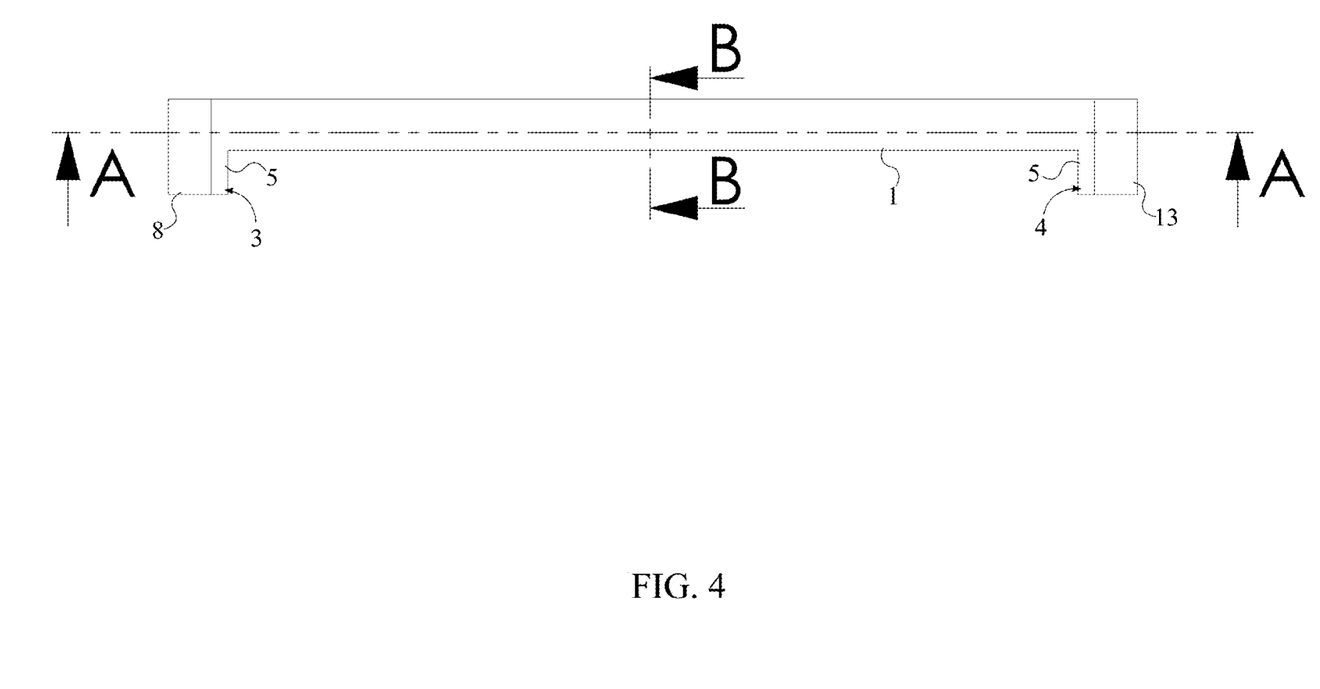
FIG. 4 is a front view of the present invention.
Figure 5:
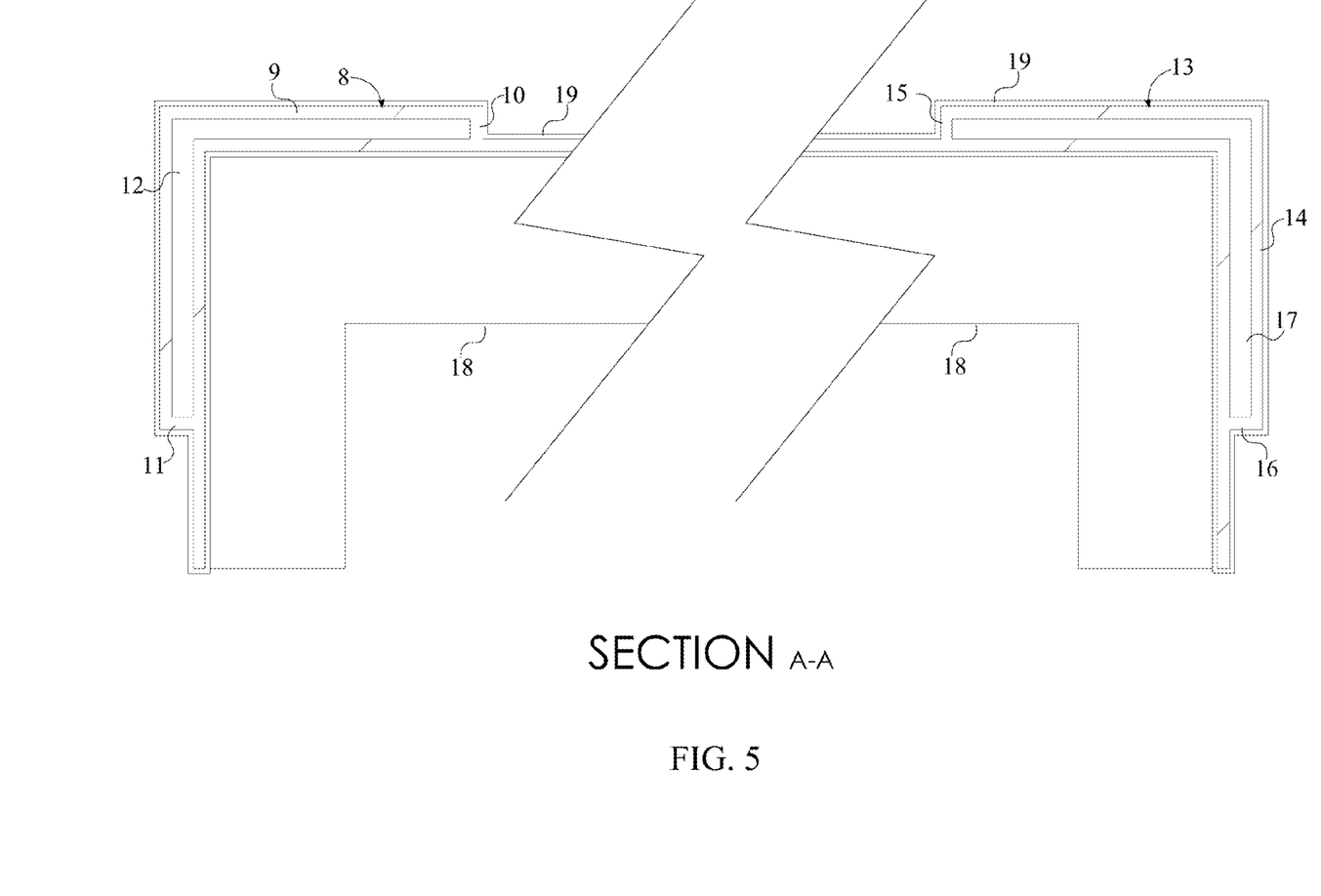
FIG. 5 is a schematic section view of the present invention taken about the line A-A in FIG. 4, wherein the weatherproof coating is shown covering the crossbar, the first L-shaped brace, the second L-shaped brace, the first support-receiving socket, and the second support-receiving socket.
Figure 6:
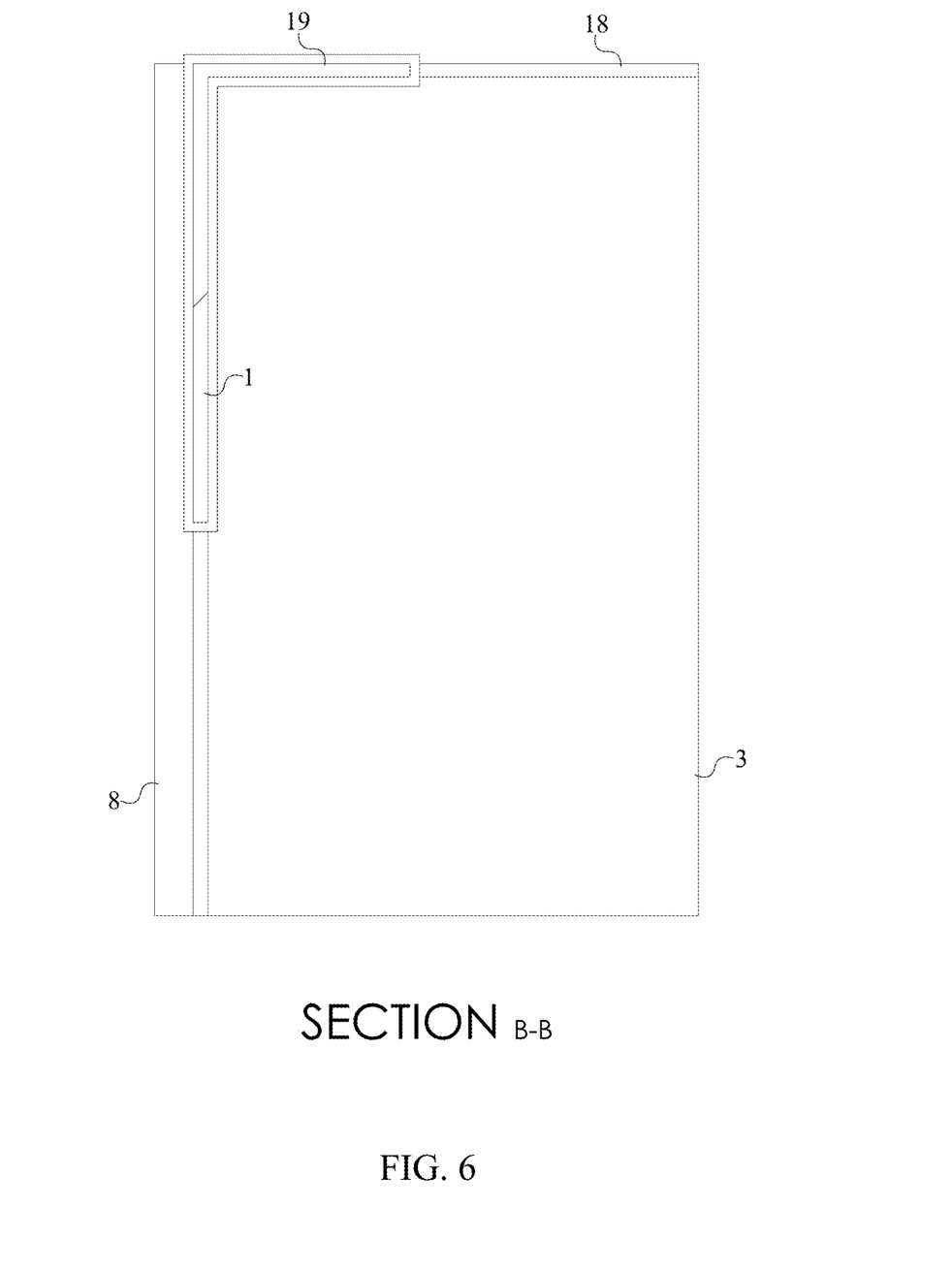
FIG. 6 is a schematic section view taken about the line B-B in FIG. 4, wherein the weatherproof coating is shown covering the crossbar and the weight-bearing panel.
Figure 7:
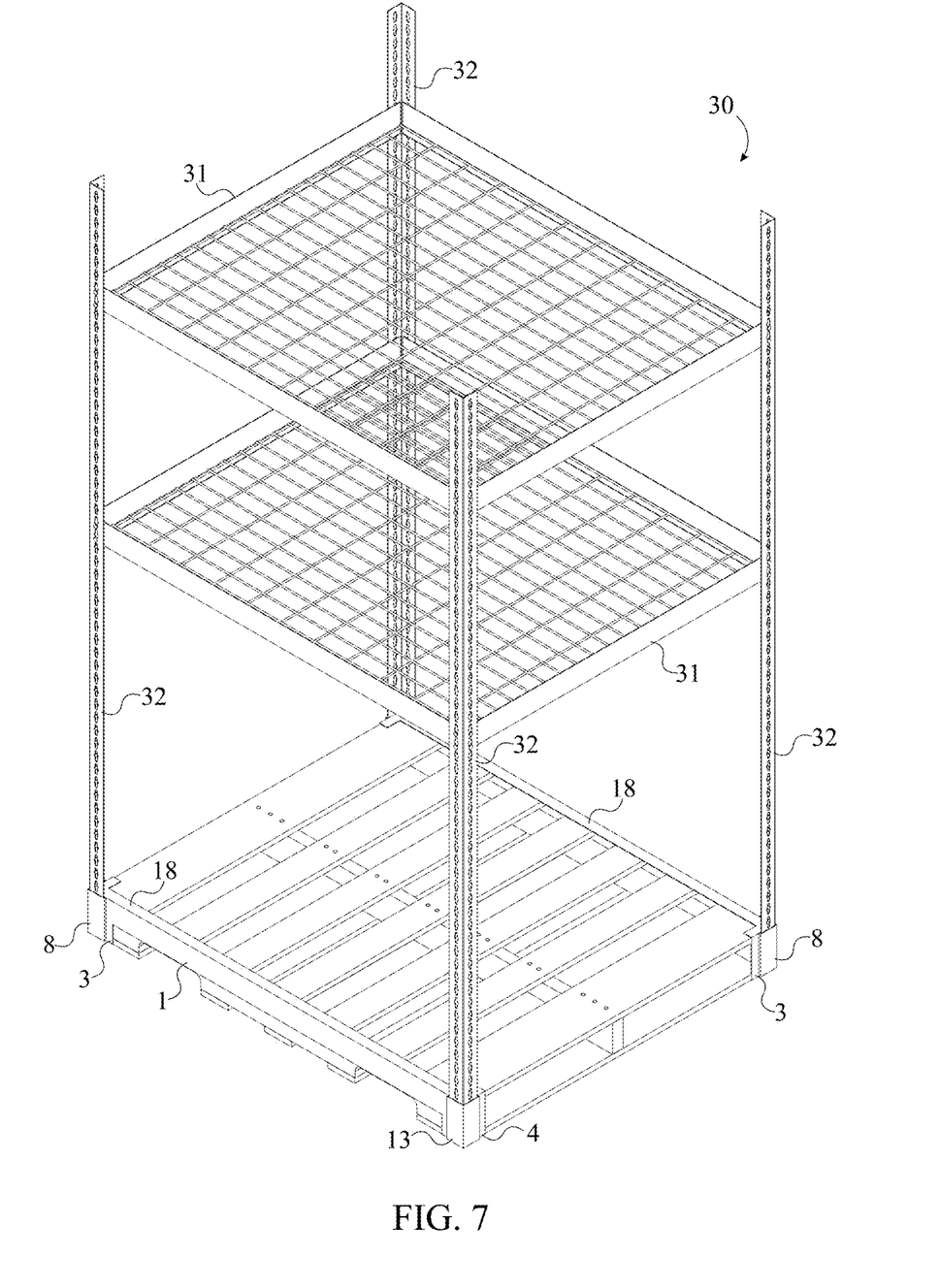
FIG. 7 is a perspective view of two shelving base brackets used to support a shelving unit.
Figure 8:
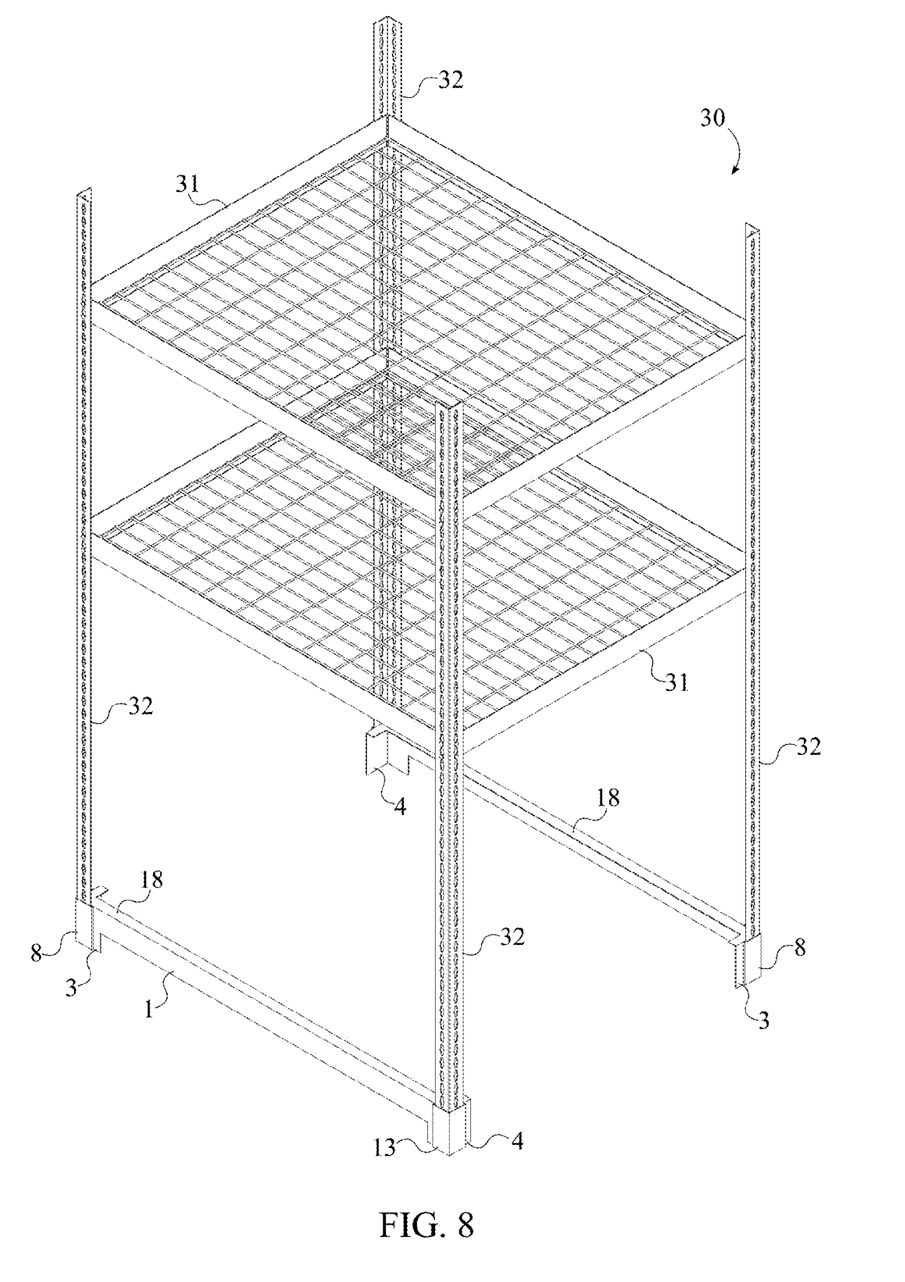
FIG. 8 is a perspective view of two shelving base brackets used to support a shelving unit without a pallet.

In reference to FIGS. 4-6, the present invention further comprises a weatherproof coating 19. The weatherproof coating 19 may be a painted coating or powder coated finish applied to the present invention. The weatherproof coating 19 is externally layered onto the present invention. More specifically, the weatherproof coating is layered onto the crossbar 1, the first L-shaped brace 3, the second L-shaped brace 4, the first support-receiving socket 8, the second support-receiving socket 13, and the weight-bearing panel 18. The weatherproof coating 19 is used to protect the present invention from rust, general wear and tear, and other potentially harmful environmental elements.

Although the invention has been explained in relation to its preferred embodiment, it is to be understood that many other possible modifications and variations can be made without departing from the spirit and scope of the invention as hereinafter claimed.

What is claimed is:

1. A shelving base bracket comprises:
   a crossbar;
   a first L-shaped brace;
   a second L-shaped brace;
   a first support-receiving socket;
   a second support-receiving socket;
   a weight-bearing panel;
   the first L-shaped brace and the second L-shaped brace both comprise a proximal panel and a distal panel;
   the proximal panel of the first L-shaped brace and the proximal panel of second L-shaped brace being positioned coplanar to each other;
   the crossbar being connected in between the proximal panel of the first L-shaped brace and the proximal panel of second L-shaped brace;
   the distal panel of the first L-shaped brace being connected adjacent and perpendicular to the proximal panel of the first L-shaped brace, opposite to the crossbar;
   the distal panel of the second L-shaped brace being connected adjacent and perpendicular to the proximal panel of the second L-shaped brace, opposite to the crossbar;
   the weight-bearing panel being positioned perpendicular to both the proximal panel and the distal panel of both the first L-shaped brace and the second L-shaped brace;
   the weight-bearing panel being positioned opposite to a base surface of both the first L-shaped brace and the second L-shaped brace;
   the weight-bearing panel being connected onto the first L-shaped brace, along the crossbar, and onto the second L-shaped brace.

2. The shelving base bracket as claimed in claim 1 comprises:
   the crossbar being an elongated panel;
   the crossbar being positioned coplanar to the proximal panel of the first L-shaped brace and the proximal panel of second L-shaped brace; and
   a fork-engaging surface of the crossbar being positioned offset from a base surface of both the first L-shaped brace and the second L-shaped brace, wherein a fork-receiving opening is delineated by the fork-engaging surface, the first L-shaped brace, and the second L-shaped brace.

3. The shelving base bracket as claimed in claim 1 comprises:
- the first support-receiving socket comprises a first jacket, a first proximal spacer, a first distal spacer, and a first support stop;
- the first proximal spacer being laterally connected onto the proximal panel of the first L-shaped brace;
- the first distal spacer being laterally connected onto the distal panel of the first L-shaped brace;
- the first jacket being laterally mounted to the first L-shaped brace from the first proximal spacer to the first distal spacer; and
- the first support stop being connected between the first jacket and the first L-shaped brace.

4. The shelving base bracket as claimed in claim 1 comprises:
- the second support-receiving socket comprises a second jacket, a second proximal spacer, a second distal spacer, and a second support stop;
- the second proximal spacer being laterally connected onto the proximal panel of the second L-shaped brace;
- the second distal spacer being laterally connected onto the distal panel of the second L-shaped brace;
- the second jacket being laterally mounted to the second L-shaped brace from the second proximal spacer to the second distal spacer; and
- the second stop being connected between the second jacket and the second L-shaped brace.

5. The shelving base bracket as claimed in claim 1 comprises:
- a weatherproof coating; and
- the weatherproof coating being externally layered onto the crossbar, the first L-shaped brace, the second L-shaped brace, the first support-receiving socket, the second support-receiving socket, and a weight-bearing panel.

6. A shelving base bracket comprises:
- a crossbar;
- a first L-shaped brace;
- a second L-shaped brace;
- a first support-receiving socket;
- a second support-receiving socket;
- the first L-shaped brace and the second L-shaped brace both comprise a proximal panel and a distal panel;
- the proximal panel of the first L-shaped brace and the proximal panel of second L-shaped brace being positioned coplanar to each other;
- the crossbar being connected in between the proximal panel of the first L-shaped brace and the proximal panel of second L-shaped brace;
- the distal panel of the first L-shaped brace being connected adjacent and perpendicular to the proximal panel of the first L-shaped brace, opposite to the crossbar;
- the distal panel of the second L-shaped brace being connected adjacent and perpendicular to the proximal panel of the second L-shaped brace, opposite to the crossbar;
- the crossbar being an elongated panel;
- the crossbar being positioned coplanar to the proximal panel of the first L-shaped brace and the proximal panel of second L-shaped brace;
- a fork-engaging surface of the crossbar being positioned offset from a base surface of both the first L-shaped brace and the second L-shaped brace, wherein a fork-receiving opening is delineated by the fork-engaging surface, the first L-shaped brace, and the second L-shaped brace;
- the first support-receiving socket comprises a first jacket, a first proximal spacer, a first distal spacer, and a first support stop;
- the first proximal spacer being laterally connected onto the proximal panel of the first L-shaped brace;
- the first distal spacer being laterally connected onto the distal panel of the first L-shaped brace;
- the first jacket being laterally mounted to the first L-shaped brace from the first proximal spacer to the first distal spacer; and
- the first support stop being connected between the first jacket and the first L-shaped brace.

7. The shelving base bracket as claimed in claim 6 comprises:
- a weight-bearing panel;
- the weight-bearing panel being positioned perpendicular to both the proximal panel and the distal panel of both the first L-shaped brace and the second L-shaped brace;
- the weight-bearing panel being positioned opposite to a base surface of both the first L-shaped brace and the second L-shaped brace; and
- the weight-bearing panel being connected onto the first L-shaped brace, along the crossbar, and onto the second L-shaped brace.

8. The shelving base bracket as claimed in claim 6 comprises:
- the second support-receiving socket comprises a second jacket, a second proximal spacer, a second distal spacer, and a second support stop;
- the second proximal spacer being laterally connected onto the proximal panel of the second L-shaped brace;
- the second distal spacer being laterally connected onto the distal panel of the second L-shaped brace;
- the second jacket being laterally mounted to the second L-shaped brace from the second proximal spacer to the second distal spacer; and
- the second stop being connected between the second jacket and the second L-shaped brace.

9. The shelving base bracket as claimed in claim 6 comprises:
- a weatherproof coating; and
- the weatherproof coating being externally layered onto the crossbar, the first L-shaped brace, the second L-shaped brace, the first support-receiving socket, the second support-receiving socket, and a weight-bearing panel.

10. A shelving base bracket comprises:
- a crossbar;
- a first L-shaped brace;
- a second L-shaped brace;
- a first support-receiving socket;
- a second support-receiving socket;
- a weight-bearing panel;
- a weatherproof coating;
- the weatherproof coating being externally layered onto the crossbar, the first L-shaped brace, the second L-shaped brace, the first support-receiving socket, the second support-receiving socket, and the weight-bearing panel;
- the first L-shaped brace and the second L-shaped brace both comprise a proximal panel and a distal panel;
- the proximal panel of the first L-shaped brace and the proximal panel of second L-shaped brace being positioned coplanar to each other;
- the crossbar being connected in between the proximal panel of the first L-shaped brace and the proximal panel of second L-shaped brace;

the distal panel of the first L-shaped brace being connected adjacent and perpendicular to the proximal panel of the first L-shaped brace, opposite to the crossbar;

the distal panel of the second L-shaped brace being connected adjacent and perpendicular to the proximal panel of the second L-shaped brace, opposite to the crossbar;

the weight-bearing panel being positioned perpendicular to both the proximal panel and the distal panel of both the first L-shaped brace and the second L-shaped brace;

the weight-bearing panel being positioned opposite to a base surface of both the first L-shaped brace and the second L-shaped brace; and the weight-bearing panel being connected onto the first L-shaped brace, along the crossbar, and onto the second L-shaped brace.

11. The shelving base bracket as claimed in claim 10 comprises:

the crossbar being an elongated panel;

the crossbar being positioned coplanar to the proximal panel of the first L-shaped brace and the proximal panel of second L-shaped brace; and a fork-engaging surface of the crossbar being positioned offset from a base surface of both the first L-shaped brace and the second L-shaped brace, wherein a fork-receiving opening is delineated by the fork-engaging surface, the first L-shaped brace, and the second L-shaped brace.

12. The shelving base bracket as claimed in claim 10 comprises:

the first support-receiving socket comprises a first jacket, a first proximal spacer, a first distal spacer, and a first support stop;

the first proximal spacer being laterally connected onto the proximal panel of the first L-shaped brace;

the first distal spacer being laterally connected onto the distal panel of the first L-shaped brace;

the first jacket being laterally mounted to the first L-shaped brace from the first proximal spacer to the first distal spacer; and the first support stop being connected between the first jacket and the first L-shaped brace.

13. The shelving base bracket as claimed in claim 10 comprises:

the second support-receiving socket comprises a second jacket, a second proximal spacer, a second distal spacer, and a second support stop;

the second proximal spacer being laterally connected onto the proximal panel of the second L-shaped brace;

the second distal spacer being laterally connected onto the distal panel of the second L-shaped brace;

the second jacket being laterally mounted to the second L-shaped brace from the second proximal spacer to the second distal spacer; and the second stop being connected between the second jacket and the second L-shaped brace.

\* \* \* \* \*